US010164259B2

(12) United States Patent
Mukai et al.

(10) Patent No.: US 10,164,259 B2
(45) Date of Patent: Dec. 25, 2018

(54) BINDER FOR USE IN POSITIVE ELECTRODE FOR LITHIUM ION SECONDARY BATTERY, POSITIVE ELECTRODE FOR LITHIUM ION SECONDARY BATTERY CONTAINING SAID BINDER, LITHIUM ION SECONDARY BATTERY USING SAID POSITIVE ELECTRODE, AND ELECTRICAL MACHINERY AND APPARATUS

(71) Applicants: NATIONAL INSTITUTE OF ADVANCED INDUSTRIAL SCIENCE AND TECHNOLOGY, Tokyo (JP); SUMITOMO SEIKA CHEMICALS CO., LTD., Hyogo (JP)

(72) Inventors: Takashi Mukai, Osaka (JP); Masanori Morishita, Osaka (JP); Tetsuo Sakai, Osaka (JP); Yuji Kinpara, Hyogo (JP); Junichi Fujishige, Hyogo (JP); Nobutaka Fujimoto, Hyogo (JP); Shuichi Karashima, Osaka (JP)

(73) Assignees: National Institute of Advanced Industrial Science and Technology, Tokyo (JP); Sumitomo Seika Chemicals Co., Ltd., Hyogo (JP)

( * ) Notice: Subject to any disclaimer, the term of this patent is extended or adjusted under 35 U.S.C. 154(b) by 26 days.

(21) Appl. No.: 14/432,626

(22) PCT Filed: Oct. 1, 2013

(86) PCT No.: PCT/JP2013/005853
§ 371 (c)(1),
(2) Date: Mar. 31, 2015

(87) PCT Pub. No.: WO2014/057627
PCT Pub. Date: Apr. 17, 2014

(65) Prior Publication Data
US 2015/0280237 A1  Oct. 1, 2015

(30) Foreign Application Priority Data
Oct. 12, 2012 (JP) ................................ 2012-227150

(51) Int. Cl.
H01M 4/62 (2006.01)
H01M 4/136 (2010.01)
C08F 216/06 (2006.01)
C08F 218/08 (2006.01)
C08F 220/06 (2006.01)
C08F 220/14 (2006.01)
C09D 129/04 (2006.01)
H01M 10/0525 (2010.01)
H01M 4/58 (2010.01)
H01M 4/36 (2006.01)
C09D 133/02 (2006.01)

(52) U.S. Cl.
CPC .......... *H01M 4/622* (2013.01); *C08F 216/06* (2013.01); *C08F 218/08* (2013.01); *C08F 220/06* (2013.01); *C08F 220/14* (2013.01); *C09D 129/04* (2013.01); *H01M 4/136* (2013.01); *H01M 4/625* (2013.01); *C09D 133/02* (2013.01); *H01M 4/366* (2013.01); *H01M 4/5825* (2013.01); *H01M 10/0525* (2013.01); *H01M 2220/20* (2013.01); *H01M 2220/30* (2013.01)

(58) Field of Classification Search
CPC ............ H01M 4/02; H01M 4/04; H01M 4/62; H01M 4/621; H01M 4/622
See application file for complete search history.

(56) References Cited

U.S. PATENT DOCUMENTS

| 5,445,669 | A | * | 8/1995 | Nakabayashi | B01D 53/228 423/226 |
|---|---|---|---|---|---|
| 5,525,444 | A | * | 6/1996 | Ito | H01M 4/621 429/206 |
| 6,573,004 | B1 | | 6/2003 | Igarashi et al. | |
| 8,652,687 | B2 | * | 2/2014 | Zhamu | H01G 11/38 361/502 |
| 2003/0082448 | A1 | | 5/2003 | Cho et al. | |
| 2009/0053603 | A1 | | 2/2009 | Hoshiba et al. | |
| 2011/0003202 | A1 | | 1/2011 | Wakizaka et al. | |
| 2012/0070737 | A1 | | 3/2012 | Son et al. | |
| 2013/0112928 | A1 | | 5/2013 | Omote et al. | |
| 2013/0286545 | A1 | | 10/2013 | Kojima et al. | |
| 2014/0045054 | A1 | * | 2/2014 | Komaba | H01M 4/622 429/188 |

FOREIGN PATENT DOCUMENTS

| CN | 1124413 A | 6/1996 |
|---|---|---|
| EP | 0638353 A1 | 2/1995 |
| EP | 2690688 A1 | 1/2014 |
| JP | 11-250915 A | 9/1999 |

(Continued)

OTHER PUBLICATIONS

Machine translation of KR2009-019630.*
Wang, Jiajun, et al, "Understanding and Recent Development of Carbon Coating on LiFePO$_4$ Cathode Materials for Lithium-ion Batteries", *Energy & Environmental Science*, 2012, pp. 5163-5185, vol. 5, The Royal Society of Chemistry, Great Britian.
European Patent Office, Extended European Search Report for Application No. 13845915.1, dated Apr. 29, 2016, 10 pages, Germany.

(Continued)

*Primary Examiner* — Haidung D Nguyen
(74) *Attorney, Agent, or Firm* — Alston & Bird LLP

(57) ABSTRACT

This binder for use in a positive electrode for a lithium ion secondary battery contains a copolymer of both vinyl alcohol and an alkali-metal-neutralized ethylenically unsaturated carboxylic acid.

5 Claims, No Drawings

(56) References Cited

FOREIGN PATENT DOCUMENTS

| | | |
|---|---|---|
| JP | 2001-283853 A | 10/2001 |
| JP | 2002-033105 A | 1/2002 |
| JP | 2003-007299 A | 1/2003 |
| JP | 2003-100298 A | 4/2003 |
| JP | 2005-085557 A | 3/2005 |
| JP | 2007-173047 A | 7/2007 |
| JP | 2008-204829 A | 9/2008 |
| JP | 2010-009940 A | 1/2010 |
| JP | 2010-146871 A | 7/2010 |
| JP | 2011-046764 A | 3/2011 |
| JP | 2011-113923 A | 6/2011 |
| JP | 2012-064574 A | 3/2012 |
| JP | 2012-142311 A | 7/2012 |
| JP | 2012-146635 A | 8/2012 |
| JP | 2012-164675 A | 8/2012 |
| JP | 2012-184201 A | 9/2012 |
| KR | 2009-019630 A | 2/2009 |
| WO | WO 2009/107778 A1 | 9/2009 |
| WO | WO 2012/133034 A1 | 10/2012 |

OTHER PUBLICATIONS

International Searching Authority, International Search Report (ISR) and Written Opinion for International Application No. PCT/JP2013/005853, dated Nov. 26, 2013, 9 pages, Japanese Patent Office.
Office Action for European Application No. 13845915.1 dated Sep. 26, 2017, 5 pages.

\* cited by examiner

BINDER FOR USE IN POSITIVE ELECTRODE FOR LITHIUM ION SECONDARY BATTERY, POSITIVE ELECTRODE FOR LITHIUM ION SECONDARY BATTERY CONTAINING SAID BINDER, LITHIUM ION SECONDARY BATTERY USING SAID POSITIVE ELECTRODE, AND ELECTRICAL MACHINERY AND APPARATUS

CROSS REFERENCE TO RELATED APPLICATIONS

This application is a national stage application, filed under 35 U.S.C. § 371, of International Application No. PCT/JP2013/005853, filed Oct. 1, 2013, which claims priority to Japanese Application No. 2012-227150, filed Oct. 12, 2012, the contents of all of which as are being hereby incorporated by reference in their entirety.

BACKGROUND

Technical Field

The present invention relates to a binder intended for a positive electrode of a lithium ion secondary battery and having excellent high-rate discharge characteristics, a positive electrode of a lithium ion secondary battery containing the binder, and a lithium ion secondary battery using the positive electrode.

Description of Related Art

In recent years, with widespread use of portable electronic devices such as laptop computers, smartphones, portable game machines, and PDAs, the need for reducing the size of second batteries used as power sources and increasing the density of energy has been growing in order to reduce the weight of the above-described devices and achieve the use of the above-described devices for a longer period of time.

Particularly in recent years, the use of secondary batteries as power sources for vehicles such as electric bicycles, electric motorcycles, and electric automobiles has been widespread. Batteries having a high density of energy and being capable of operating in a wide temperature range have been demanded as the secondary batteries used as the power sources for vehicles.

Conventionally, e.g., nickel-cadmium batteries and nickel-hydrogen batteries have been mainly used as secondary batteries. However, the use of lithium ion secondary batteries tends to increase due to the need for size reduction and a higher density of energy as described above.

Typically in a lithium ion secondary battery, lithium cobalt oxide (LiCoO2) is used as a positive electrode, a carbon electrode is used as a negative electrode, and a non-aqueous electrolytic solution formed in such a manner that lithium ions are dissolved in an organic solvent such as propylene carbonate is used as an electrolyte. Transition metal oxides containing lithium ions, such as lithium nickel oxide (LiNiO2) or spinel type lithium manganite (LiMn2O4), have been known as other types of positive electrode active material.

In these positive electrode active materials, the capacity and stability of the positive electrode active material are determined by reversible insertion/removal reaction of the lithium ions. The capacity of the positive electrode active material increases with increasing the amount of Li removed from the positive electrode active material. More removed Li results in a higher charge voltage.

However, due to an increase in the amount of Li removed from the positive electrode active material, breakdown of the crystal structure of the positive electrode active material and oxidative decomposition of a binder and an organic electrolyte due to an increase in the charge voltage may occur. As a result, there is a concern that battery characteristics such as high-rate discharge characteristics and cycle characteristics are degraded.

In order to improve the high-rate discharge characteristics, various proposals have been made to improve the positive electrode active material, a negative electrode active material, the electrolyte, and the electrolytic solution, but there is the limited number of proposals on the binder (see, e.g., Patent Documents 1, 2, and 3).

However, the binders disclosed in these patent documents are used in the form of a latex, an emulsion, or a liquid solution using an organic solvent, and there is a problem of increasing an environmental load due to the use of the organic solvent.

Moreover, in order to improve the cycle characteristics, the method of covering the positive electrode active material with oxide such as Al2O3, ZrO2, TiO2, SiO2, or AlPO4 has been proposed (see, e.g., Patent Document 4).

However, since these oxides are insulators, there is a problem that the conduction path of the lithium ions and the electron transfer path are blocked particularly in rapid charging/discharging to cause an increase in an electrode reaction resistance, resulting in a decrease in a battery capacity.

The electrodes of the lithium ion secondary battery are formed in such a manner that the active material, the binder, and a conductive assistant are applied onto a current collector and then are dried.

For example, the positive electrode is formed in such a manner that a slurry in which LiCoO2 as the active material, polyvinylidene fluoride (PVdF) as the binder, and carbon black as the conductive assistant disperse is applied onto an aluminum foil current collector and then is dried. However, since the PVdF does not dissolve or disperse in water, N-methyl-2-pyrrolidone (NMP) is required as the organic solvent, and therefore, there is a problem on the environmental load. In addition, the PVdF swells in the electrolytic solution under a high-temperature environment of equal to or higher than 50° C., resulting in weakening of binding force and an increase in an electrode resistance. As a result, the positive electrode lacks high-temperature durability.

On the other hand, the negative electrode is formed in such a manner that a slurry in which graphite as the active material, carboxymethylcellulose (CMC) and styrene-butadiene rubber (SBR) as the binders, and carbon black as the conductive assistant disperse is applied onto a copper foil current collector and then is dried. The CMC and the SBR dissolve or disperse in water, resulting in a less environmental load with a low cost.

In addition to the CMC and the SBR, a lithium secondary battery binder composition containing a crosslinked compound of polyacrylic acid subjected to exchange for alkali cations and polyvinyl alcohol has been proposed as an aqueous binder (see, e.g., Patent Document 5).

In Patent Document 5, in the case where the crosslinked compound of polyacrylic acid subjected to exchange for alkali cations and polyvinyl alcohol is used for the negative electrode as the lithium secondary battery binder, there is an advantage in improvement of the life characteristics of the electrode. However, the example where such a binder is used for the positive electrode has not been disclosed, and there is no description on the high-rate discharge characteristics remaining the issue unique to the lithium secondary battery.

Unlike the negative electrode, the reasons why it is difficult to use the aqueous binder for the positive electrode are, for example, as follows:

(1) in charging, oxidative decomposition of the aqueous binder occurs;
(2) it is difficult to uniformly disperse the slurry;
(3) if an attempt is made to improve the capacity of the positive electrode by an increase in the thickness thereof, cracking occurs at the electrode due to cohesive stress caused by drying; and
(4) the positive electrode active material and water contact and react with each other, and therefore, lithium of the positive electrode active material dissolves out to cause cracking of the positive electrode and to decrease the capacity of the positive electrode.

Since a sufficient conduction path cannot be ensured in the electrode due to cracking in the electrode, there is a concern that the high-rate discharge characteristics as the battery characteristics are degraded and that a decrease in the capacity of the positive electrode and degradation of the cycle characteristics occur due to dissolving of lithium of the positive electrode active material.

It is often the case that active materials in a battery material system do not exhibit favorable battery characteristics merely by new combination of existing materials, resulting in no predictability. For such a reason, in evaluation of the battery material system, it is required even for the existing materials that the battery material system is evaluated as a battery and that the benefit of the battery material system is proved based on evaluation results. In other words, even when the material itself is known, if no evaluation is made on such a material as a battery, such a material is regarded as an unknown material in the battery material system. Moreover, if a battery does not operate as a whole, such a battery is useless. Thus, even if any useful active materials are used, the compatibility with a binder, a conductive assistant, and a current collector should be fully taken into consideration, and an antipole, an electrolytic solution, etc. are also important.

CITATION LIST

Patent Document

PATENT DOCUMENT 1: Japanese Unexamined Patent Publication No. 2010-146871
PATENT DOCUMENT 2: Japanese Unexamined Patent Publication No. 2008-204829
PATENT DOCUMENT 3: Japanese Unexamined Patent Publication No. 2007-173047
PATENT DOCUMENT 4: Japanese Unexamined Patent Publication No. 2003-007299
PATENT DOCUMENT 5: Japanese Unexamined Patent Publication No. 2012-064574

BRIEF SUMMARY

Technical Problem

The present invention has been made in view of the current status of the prior art described above, and is mainly intended to provide a lithium ion secondary battery positive electrode binder having, even if an aqueous binder is used, excellent high-rate discharge characteristics without a decrease in the capacity of a positive electrode active material, a positive electrode containing the binder, a lithium ion secondary battery, and electric equipment using the secondary battery.

Solution to the Problem

After thorough study conducted to accomplish the above-described objective, the present inventors have found that a copolymer of vinyl alcohol and an alkali metal-neutralized product of ethylene-unsaturated carboxylic acid is used as a binder for a positive electrode of a lithium ion secondary battery to obtain a lithium ion secondary battery having excellent high-rate discharge characteristics, and therefore, have arrived at the present invention.

The binder for the positive electrode of the lithium ion secondary battery according to the present invention includes the copolymer of the vinyl alcohol and the alkali metal-neutralized product of ethylene-unsaturated carboxylic acid.

In the above-described binder, the copolymer of the vinyl alcohol and the alkali metal-neutralized product of ethylene-unsaturated carboxylic acid may be contained at equal to or greater than 20% by mass.

In the copolymer of the vinyl alcohol and the alkali metal-neutralized product of ethylene-unsaturated carboxylic acid, the molar ratio of the vinyl alcohol to the alkali metal-neutralized product of ethylene-unsaturated carboxylic acid is preferably 8/2 to 2/8.

The alkali metal-neutralized product of ethylene-unsaturated carboxylic acid is preferably an alkali metal-neutralized product of acrylic acid or an alkali metal-neutralized product of methacrylic acid.

The mass average particle size of the copolymer of the vinyl alcohol and the alkali metal-neutralized product of ethylene-unsaturated carboxylic acid is preferably equal to or greater than 10 μm and equal to or less than 100 μm.

The viscosity of an aqueous solution containing, at 1% by mass, the copolymer of the vinyl alcohol and the alkali metal-neutralized product of ethylene-unsaturated carboxylic acid is preferably equal to or greater than 100 mPa·s and equal to or less than 3,500 mPa·s.

The positive electrode of the lithium ion secondary battery according to the present invention includes an active material; a conductive assistant; and the binder of any one of the above-described aspects.

In the above-described positive electrode of the lithium ion secondary battery, the binder is preferably contained at equal to or greater than 0.5% by mass and equal to or less than 30% by mass with respect to a total mass of the active material, the conductive assistant, and the binder. A carbon nanotube is preferably contained as the conductive assistant. The content of the carbon nanotube in the conductive assistant is preferably equal to or greater than 30% by mass.

The lithium ion secondary battery of the present invention includes the above-described positive electrode of the lithium ion secondary battery.

An electric equipment of the present invention includes the above-described lithium ion secondary battery.

Advantages of the Invention

According to the present invention, an aqueous binder causing a less environmental load and having excellent thermal resistance is used to provide, with not only excellent positive electrode capacity and cycle characteristics but also excellent high-rate discharge characteristics, a lithium ion secondary battery positive electrode, a lithium ion secondary battery, and electric equipment. Thus, in the lithium ion secondary battery of the present invention, the high-rate discharge characteristics can be improved as compared to a conventional lithium secondary battery, and both of a highly-functional battery and a lower battery cost can be realized. As a result, the lithium ion secondary battery of the present invention can be utilized for a wide variety of purposes.

DETAILED DESCRIPTION OF VARIOUS EMBODIMENTS

A binder for a positive electrode of a lithium ion secondary battery according to the present invention, a lithium ion secondary battery positive electrode and a secondary battery including the binder, and electric equipment using the second battery will be described below.

<Binder for Positive Electrode of Lithium Ion Secondary Battery>

The binder for the positive electrode of the lithium ion secondary battery according to the present invention contains a copolymer of vinyl alcohol and an alkali metal-neutralized product of ethylene-unsaturated carboxylic acid. The copolymer of the vinyl alcohol and the alkali metal-neutralized product of ethylene-unsaturated carboxylic acid is a copolymer containing, as monomers, vinyl alcohol and an alkali metal-neutralized product of ethylene-unsaturated carboxylic acid. The copolymer of the vinyl alcohol and the alkali metal-neutralized product of ethylene-unsaturated carboxylic acid can be, for example, obtained in such a manner that a copolymer obtained by copolymerization of vinyl ester and ethylene-unsaturated carboxylic acid ester is saponified in a solvent mixture of an aqueous organic solvent and water in the presence of alkali containing alkali metal. That is, although vinyl alcohol itself cannot be used as a monomer due to the instability thereof, a polymer obtained by using vinyl ester as a monomer is saponified, and as a consequence, the resultant polymer is in such a form that vinyl alcohol is polymerized as a monomer.

Examples of the above-described vinyl ester include vinyl acetate and vinyl propionate. Because of faster progress on saponification reaction, the vinyl acetate is preferable. A single type of these vinyl esters may be used alone, or two or more types of these vinyl esters may be used in combination.

Examples of the above-described ethylene-unsaturated carboxylic acid ester include methyl ester, ethyl ester, n-propyl ester, iso-propyl ester, n-butyl ester, or t-butyl ester of acrylic acid or methacrylic acid. Because of faster progress on saponification reaction, the methyl acrylate or the methyl methacrylate is preferable. A single type of these ethylene-unsaturated carboxylic acid esters may be used alone, or two or more types of these ethylene-unsaturated carboxylic acid esters may be used in combination.

If necessary, the vinyl ester and the ethylene-unsaturated carboxylic acid ester may be copolymerized with other types of ethylene-unsaturated monomer or cross-linker which can be copolymerized with the vinyl ester and the ethylene-unsaturated carboxylic acid ester.

The saponification reaction in 100% saponification of the vinyl acetate/methyl acrylate copolymer by potassium hydroxide (KOH) is shown below as an example of the saponification reaction in the present embodiment:

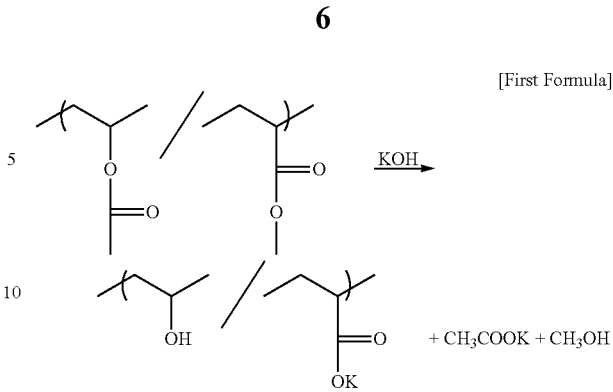

[First Formula]

As shown above, the copolymer of the vinyl alcohol and the alkali metal-neutralized product of ethylene-unsaturated carboxylic acid is a substance obtained in such a manner that the vinyl ester and the ethylene-unsaturated carboxylic acid ester are randomly copolymerized and then, an ester portion of a monomer is saponified. On the other hand, the cross-linked compound of the polyacrylic acid subjected to exchange for alkali cations and the polyvinyl alcohol as disclosed in Patent Document 5 has such a structure that the polyacrylic acid and the polyvinyl alcohol are crosslinked with each other by ester binding. Thus, the crosslinked compound of the polyacrylic acid subjected to exchange for alkali cations and the polyvinyl alcohol as disclosed in Patent Document 5 is a substance totally different from the copolymer of the vinyl alcohol and the alkali metal-neutralized product of ethylene-unsaturated carboxylic acid according to the present invention.

In the copolymer of the vinyl alcohol and the alkali metal-neutralized product of ethylene-unsaturated carboxylic acid, the molar ratio of the vinyl alcohol to the alkali metal-neutralized product of ethylene-unsaturated carboxylic acid as monomers is preferably 8/2 to 2/8, and more preferably 7/3 to 3/7. Outside a range of 8/2 to 2/8, the polymer obtained after saponification may lack holding force as the binder.

Considering formation of the copolymer in the form of powder, the vinyl ester/ethylene-unsaturated carboxylic acid ester copolymer, i.e., the precursor of the copolymer of the vinyl alcohol and the alkali metal-neutralized product of ethylene-unsaturated carboxylic acid, is preferably obtained by suspension polymerization by which in the state in which the monomers of mainly vinyl ester and ethylene-unsaturated carboxylic acid ester are in a suspended form in an aqueous dispersant solution containing a polymerization catalyst, such monomers are polymerized into polymer particles.

Examples of the above-described polymerization catalyst include organic peroxides such as benzoyl peroxide and lauryl peroxide, or azo compounds such as azobisisobutyronitrile and azobisdimethylvaleronitrile. In particular, the lauryl peroxide is preferable.

The additive amount of the polymerization catalyst with respect to the total mass of the monomers is preferably equal to or greater than 0.01% by mass and equal to or less than 5% by mass, more preferably equal to or greater than 0.05% by mass and equal to or less than 3% by mass, and much more preferably equal to or greater than 0.1% by mass and equal to or less than 3% by mass.

If the additive amount is less than 0.01% by mass, polymerization reaction may not completed. If the additive amount exceeds 5% by mass, a sufficient effect of increasing the viscosity of the resultant copolymer of the vinyl alcohol and the alkali metal-neutralized product of ethylene-unsaturated carboxylic acid may not be exhibited.

Although varied depending on the type, amount, etc. of monomer to be used, examples of the above-described dispersant specifically include polyvinyl alcohol (partially-saponified polyvinyl alcohol or completely-saponified polyvinyl alcohol), poly(meth)acrylic acid and salt thereof, water-soluble polymers such as polyvinylpyrrolidone, methylcellulose, carboxymethylcellulose, hydroxyethylcellulose, and hydroxypropylcellulose, and water-insoluble inorganic compounds such as calcium phosphate and magnesium silicate. A single type of these dispersants may be used alone, or two or more types of these dispersants may be used in combination.

Although varied depending on, e.g., the type of monomer to be used, the usage of the dispersant with respect to the total mass of the monomers is preferably equal to or greater than 0.01% by mass and equal to or less than 10% by mass, and more preferably equal to or greater than 0.05% by mass and equal to or less than 5% by mass.

Moreover, in order to adjust, e.g., the surface-active effect of the dispersant, water-soluble salt of alkali metal or rare earth-alkali metal may be added. Examples of such water-soluble salt include sodium chloride, potassium chloride, calcium chloride, lithium chloride, sodium sulfate, potassium sulfate, disodium hydrogen phosphate, dipotassium hydrogenphosphate, trisodium phosphate, and tripotassium phosphate. A single type of these water-soluble salts may be used alone, or two or more types of these water-soluble salts may be used in combination.

Although varied depending on the type, amount, etc. of dispersant to be used, the usage of the water-soluble salt with respect to the mass of the aqueous dispersant solution is typically equal to or greater than 0.01% by mass and equal to or less than 10% by mass.

The temperature, at which the monomers are polymerized, with respect to the ten-hour half-life temperature of the polymerization catalyst is preferably equal to or greater than −20° C. and equal to or less than +20° C., and more preferably equal to or greater than −10° C. and equal to or less than +10° C.

If the temperature with respect to the ten-hour half-life temperature is less than −20° C., the polymerization reaction may not completed. If the temperature with respect to the ten-hour half-life temperature exceeds than +20° C., a sufficient effect of increasing the viscosity of the resultant copolymer of the vinyl alcohol and the alkali metal-neutralized product of ethylene-unsaturated carboxylic acid may not be exhibited.

Although varied depending on the type, amount, and polymerization temperature, etc., of polymerization catalyst to be used, the time required for polymerization of the monomers is typically several hours to several tens of hours.

After completion of the polymerization reaction, the copolymer is separated by, e.g., centrifugal separation or filtration, and as a result, is obtained in the form of a water-containing cake. The resultant copolymer in the form of the water-containing cake is left stand or dried if necessary, and then, can be used for the saponification reaction.

The number average molecular weight of the above-described polymer can be obtained by a molecular weight measurement device using, as a solvent, a polar solvent such as DMF and including, e.g., a GFC column ("OHpak" manufactured by Showa Denko K.K.).

The number average molecular weight before saponification is preferably equal to or greater than 10,000 and equal to or less than 8,000,000, and more preferably equal to or greater than 50,000 and equal to or less than 1,000,000. Since the number average molecular weight before saponification is set within a range of equal to or greater than 10,000 and equal to or less than 8,000,000, the binding force of the binder is improved. Thus, even in the case of an aqueous slurry, thick-coating of the slurry is facilitated.

The saponification reaction can be performed in the solvent mixture of the aqueous organic solvent and the water in the presence of the alkali containing alkali metal. Conventionally-known alkali may be used as the alkali used for the saponification reaction, but alkali metal hydroxide is preferable. Considering high reactivity, sodium hydroxide or potassium hydroxide is particularly preferable.

The amount of the above-described alkali with respect to the number of moles of the monomers is preferably equal to or greater than 60 mol % and equal to or less than 140 mol %, and more preferably equal to or greater than 80 mol % and equal to or less than 120 mol %. If the alkali amount is less than 60 mol %, saponification may be insufficient. Even if the alkali is used with an amount of greater than 140 mol %, a further effect is not exhibited, and therefore, such use of the alkali is not economical.

Examples of the aqueous organic solvent include lower alcohols such as methanol, ethanol, n-propanol, isopropanol, n-butanol, and t-butanol, ketones such as acetone and methyl ethyl ketone, and a mixture thereof. Of these solvents, the lower alcohols are preferable. Since the copolymer of the vinyl alcohol and the alkali metal-neutralized product of ethylene-unsaturated carboxylic acid can be obtained with an excellent effect of increasing the viscosity of the copolymer and excellent resistance to mechanical shear, the methanol or the ethanol is particularly preferable.

The mixture ratio (in terms of a mass) of the aqueous organic solvent to the water in the solvent mixture is preferably 3/7 to 8/2, more preferably 3/7 to 7/3, and much more preferably 4/6 to 6/4. If the mixture ratio is outside a range of 3/7 to 8/2, the saponification reaction may not progress to a satisfactory extent due to a lack of the solvent affinity of resin before or after saponification. If the aqueous organic solvent is contained at a ratio of less than 3/7, not only the binding force of the binder is lowered, but also it is difficult to industrially obtain the saponified product of copolymer due to the significant increase in viscosity in the saponification reaction. If the aqueous organic solvent is contained at a ratio of greater than 8/2, the water solubility of the resultant saponified product of copolymer is lowered, and therefore, the binding force after drying may be reduced in use for the electrode. Note that the copolymer in the form of the water-containing cake is directly used for the saponification reaction, water contained in the copolymer in the form of the water-containing cake is taken into consideration of the mixture ratio of the aqueous organic solvent to the water in the solvent mixture.

Although varied depending on the molar ratio of monomers, the temperature at which the vinyl ester/ethylene-unsaturated carboxylic acid ester copolymer is saponified is preferably equal to or higher than 20° C. and equal to or lower than 60° C., and more preferably equal to or higher than 20° C. and equal to or lower than 50° C. If saponification is performed at a temperature of lower than 20° C., the polymerization reaction may not completed. If saponification is performed at a temperature exceeding 60° C., agitation may not be performable due to an increase in a viscosity in a reaction system.

A saponification reaction time varies depending on the type, amount, etc. of alkali to be used, such reaction is normally completed after a lapse of about several hours.

Upon completion of the saponification reaction, dispersing elements of the saponified product of copolymer in the form of paste or slurry are formed. After solid-liquid separation of the dispersing elements by a conventionally-known method such as centrifugal separation or filtration, the resultant is well cleaned with lower alcohol such as methanol. Then, the resultant liquid-containing saponified product of copolymer is dried. As a result, the saponified product of copolymer as spherical single particles or agglomerated particles formed by agglomeration of spherical particles, i.e., the copolymer of the vinyl alcohol and the alkali metal-neutralized product of ethylene-unsaturated carboxylic acid, can be obtained.

A alkali metal-neutralized product of acrylic acid and an alkali metal-neutralized product of methacrylic acid are preferable as the alkali metal-neutralized product of ethylene-unsaturated carboxylic acid, and sodium acrylate and sodium methacrylate are more preferable as the alkali metal-neutralized product of ethylene-unsaturated carboxylic acid.

The conditions for drying the liquid-containing saponified product of copolymer are not limited, but typically, drying is preferably performed at a temperature of 30° C. to 120° C. under normal pressure or reduced pressure.

Although varied depending on the pressure and temperature in drying, a drying time is typically several hours to several tens of hours.

The mass average particle size of the saponified product of copolymer, i.e., the the copolymer of the vinyl alcohol and the alkali metal-neutralized product of ethylene-unsaturated carboxylic acid, is preferably equal to or greater than 10 μm and equal to or less than 100 μm, and more preferably equal to or greater than 10 μm and equal to or less than 90 μm. If the mass average particle size is less than 10 μm, a sufficient effect of increasing the viscosity may not be exhibited. If the mass average particle size exceeds 100 μm, the effect of increasing the viscosity may be lowered due to a non-uniformly thickened aqueous solution.

The mass average particle size of the saponified product of copolymer obtained after drying of the liquid-containing saponified product of copolymer exceeds 100 μm, the mass average particle size can be adjusted to equal to or greater than 10 μm and equal to or less than 100 μm in such a manner that such a saponified product of copolymer is milled by a conventionally-known milling method such as mechanical milling.

Mechanical milling is the method for providing the resultant saponified product of copolymer with external force such as impact, tension, friction, compression, or shear. Examples of devices for mechanical milling include a tumbling mill, a vibrating mill, a planetary mill, an oscillating mill, a horizontal mill, an attrition mill, a jet mill, a raikai mixer, a homogenizer, a fluidizer, a paint shaker, and a mixer. For example, the planetary mill is configured as follows. The saponified product of copolymer and balls are together placed in a container, and then, mechanical energy is generated by performing rotation and revolution at the same time. This mills or mixes the saponified product of copolymer. It has been known that according to such a method, the saponified product of copolymer can be milled to nano-order.

Regarding the effect of increasing the viscosity of the copolymer of the vinyl alcohol and the alkali metal-neutralized product of ethylene-unsaturated carboxylic acid, the viscosity of the aqueous solution containing, at 1% by mass, the copolymer of the vinyl alcohol and the alkali metal-neutralized product of ethylene-unsaturated carboxylic acid is preferably equal to or greater than 100 mPa·s and equal to or less than 3,500 mPa·s, and more preferably equal to or greater than 200 mPa·s and equal to or less than 2,000 Pa·s. If the viscosity is less than 100 mPa·s, the viscosity of the resultant slurry of positive-electrode mixture is low, and therefore, such a mixture spreads in application thereof to a current collector. As a result, it might be difficult to apply the positive-electrode mixture or an active material and a conductive assistant might poorly disperse in the positive-electrode mixture. If the viscosity exceeds 3,500 mPa·s, the viscosity of the resultant positive-electrode mixture is high, and therefore, it may be difficult to thinly and uniformly apply such a mixture to the current collector.

Note that the viscosity of the one-mass-percent solution can be measured using a spindle No. 5 of a rotary viscometer (a type of RVDV-I+) manufactured by Brookfield Engineering at 50 rpm (a liquid temperature of 25° C.).

The reasons why the copolymer of the vinyl alcohol and the alkali metal-neutralized product of ethylene-unsaturated carboxylic acid can function as the binder, having excellent high-rate discharge characteristics, for the positive electrode of the lithium ion secondary battery are considered as follows. Since the copolymer of the vinyl alcohol and the alkali metal-neutralized product of ethylene-unsaturated carboxylic acid does not swell in a high-temperature electrolytic solution, an increase in an electrode resistance is suppressed, and the binding force of the binder is not weakened.

Typically, if an aqueous binder is used as a binder for a positive electrode, lithium as a starting material dissolves in water, and therefore, the actual capacity of a lithium ion secondary battery decreases. However, according to the present invention, a positive electrode material containing the active material containing the metal oxide or carbon on the surfaces of particles of the active material is used, and therefore, the problem of decreasing in actual capacity is not caused even if the aqueous binder is employed.

Other types of aqueous binder (soluble or dispersible in water) further added to the copolymer of the vinyl alcohol and the alkali metal-neutralized product of ethylene-unsaturated carboxylic acid may be used as the binder for the positive electrode according to the present embodiment.

Examples of the other types of aqueous binder include carboxymethylcellulose (CMC), acrylic resin, sodium polyacrylate, sodium alginate, polyimide (PI), polyamide, polyamideimide, polyacrylic acid, styrene-butadiene rubber (SBR), styrene-ethylene-butylene-styrene copolymer (SEBS), polyvinyl alcohol (PVA), and ethylene vinyl acetate copolymer (EVA). A single type of these materials may be used alone, or two or more types of these materials may be used in combination.

Of the other types of aqueous binder, the carboxymethylcellulose (CMC), the acrylic resin, the sodium polyacrylate, the sodium alginate, and the polyimide are preferably used, and the carboxymethylcellulose (CMC) is more preferably used. Addition of the carboxymethylcellulose (CMC) can further improve the capacity density of the positive electrode.

The additive amount of the other types of aqueous binder in the case of further adding the other types of aqueous binder to the copolymer of the vinyl alcohol and the alkali metal-neutralized product of ethylene-unsaturated carboxylic acid is preferably equal to or less than 80% by mass with respect to the total mass of the copolymer of the vinyl alcohol and the alkali metal-neutralized product of ethylene-unsaturated carboxylic acid and the other types of aqueous binder, and more preferably equal to or less than 70% by mass. In other words, the content ratio of the copolymer of the vinyl alcohol and the alkali metal-neutralized product of ethylene-unsaturated carboxylic acid in the binder is preferably equal to or greater than 20% by mass and equal to or less than 100% by mass, and more preferably equal to or greater than 30% by mass and equal to or less than 100% by mass.

<Positive Electrode Active Material>

A positive electrode active material used in the technical field of the present invention can be used as the positive electrode active material. Examples of the preferably-used positive electrode active material include lithium iron phosphate (LiFePO4), lithium manganese phosphate (LiMnPO4), lithium cobalt phosphate (LiCoPO4), iron pyrophosphate (Li2FeP2O7), lithium cobaltate composite oxide (LiCoO2), spinel type lithium manganese composite oxide (LiMn2O4), lithium manganese composite oxide (LiMnO2), lithium nickel composite oxide (LiNiO2), lithium niobium composite oxide (LiNbO2), lithium iron composite oxide (LiFeO2), lithium magnesium composite oxide (LiMgO2), lithium calcium composite oxide (LiCaO2), lithium copper composite oxide (LiCuO2), lithium zinc composite oxide (LiZnO2), lithium molybdenum composite oxide (LiMoO2), lithium tantalum composite oxide (LiTaO2), lithium tungsten composite oxide (LiWO2), lithium-nickel-cobalt-aluminum composite oxide (LiNi0.8Co0.15Al0.05O2), lithium-nickel-cobalt-manganese composite oxide (LiNi0.33Co0.33Mn0.33O2), Li-rich nickel-cobalt-manganese composite oxide (an LiXNiACoB-MnCO2 solid solution), nickel manganese oxide (LiNi0.5Mn1.5O4), manganese oxide (MnO2), vanadium-based oxides, sulfur-based oxides, and silicate-based oxides.

<Conductive Assistant>

As long as the conductive assistant has conductivity, the conductive assistant is not limited. However, carbon powder is preferable. Examples of the carbon powder include typically-used carbon materials such as acetylene black (AB), Ketjen black (KB), black lead, carbon fibers, a carbon tube, graphene, amorphous carbon, hard carbon, soft carbon, glassy carbon, carbon nanofibers, and a carbon nanotube. A single type of these materials may be used alone, or two or more of these materials may be used in combination. Of these materials, the carbon nanofibers and the carbon nanotube are preferable, and the carbon nanotube is more preferable, considering improvement in conductivity. If the carbon nanotube is used as the conductive assistant, the usage thereof is not limited, but for example, is preferably equal to or greater than 30% by mass and equal to or less than 100% by mass with respect to the total of the conductive assistant, and more preferably equal to or greater than 40% by mass and equal to or less than 100% by mass. If the usage of the carbon nanotube is less than 30% by mass, a sufficient conductive path cannot be ensured between the electrode active material and the current collector. Such a usage amount is not preferable because a sufficient conductive path cannot be formed particularly in high-speed charging/discharging. Note that the "carbon nanofibers" indicate fibrous materials having a thickness of several nanometers to several hundreds of nanometers. Of these materials, materials having a hollowed structure are called "carbon nanotubes," and there are various types of nanotubes such as single-layer carbon nanotubes and multilayer carbon nanotubes. These materials are formed by various methods such as vapor phase epitaxy, arc discharge, and laser evaporation, but there is no restriction on which one of the methods is employed.

<Positive Electrode>

The positive electrode can be formed in such a manner that the conductive assistant, the binder, and the water are added to the positive electrode active material to form the paste of the positive electrode active material and the paste is applied to the current collector. The binder may dissolve in the water in advance. Alternatively, the active material and the powder of the binder are mixed together in advance, and then, the mixture may be added and mixed with the water.

The usage of the conductive assistant is not limited. However, such a usage is preferably about 1.5% by mass to 20% by mass, and more preferably about 2.0% by mass to 10% by mass, where the total of the positive electrode active material, the conductive assistant, and the binder is taken as 100% by mass. If the usage of the conductive assistant is less than 1.5% by mass, the conductivity of the positive electrode cannot be sufficiently improved. Thus, such a usage is not preferable. If the usage of the conductive assistant exceeds 20% by mass, such a usage is not preferable because of the following reasons: a high capacity is difficult to be ensured in charging/discharging of the battery due to the relative decrease in percentage of the active material; the conductive assistant is difficult to uniformly disperse due to the water being shed by carbon, and therefore, agglomeration of the active material occurs; and the surface area of the conductive assistant is large due to the conductive assistant being smaller than the active material, and therefore, the amount of binder to be used increases.

The usage of the binder is not limited. However, such a usage is preferably equal to or greater than 0.5% by mass and equal to or less than 30% by mass, more preferably equal to or greater than 1% by mass and equal to or less than 20% by mass, and much more preferably equal to or greater than 2% by mass and equal to or less than 8% by mass, where the total of the positive electrode active material, the conductive assistant, and the binder is taken as 100% by mass. This is because of the following reasons: if too much binder is contained, the high-rate discharge characteristics are degraded due to an increase in the internal electrode resistance of the positive electrode; and conversely, if too little binder is contained, insufficient cycle life characteristics are exhibited.

In the case where the other types of binder are further added to the copolymer of the vinyl alcohol and the alkali metal-neutralized product of ethylene-unsaturated carboxylic acid, the additive amount of such binder is preferably about 0.1% by mass to 10% by mass, and more preferably about 0.2% by mass to 5% by mass, where the total of the positive electrode active material, the conductive assistant, the binder (the copolymer described above), and the other types of binder is taken as 100% by mass. This is because of the following reasons: if too much of the other types of binder is contained, the high-rate discharge characteristics may be degraded due to an increase in the internal electrode resistance of the positive electrode, and high-temperature resistance may become insufficient; and conversely, if too little of the other types of binder is contained, the positive electrode capacity density may be decreased.

The current collector of the positive electrode has electric conductivity, and is not limited as long as current can be applied to the positive electrode material held by the current collector. For example, a conductive substance such as C, Ti, Cr, Mo, Ru, Rh, Ta, W, Os, Ir, Pt, Au, and Al or an alloy (e.g., stainless steel) containing two or more of these conductive substances can be used. Considering higher electric conductivity and favorable stability and oxidation resistance in the electrolytic solution, C, Al, stainless steel, etc. are preferable as the current collector. Further, considering a material cost, Al etc. are more preferable as the current collector.

The shape of the current collector is not limited, but a base material in the form of foil or a three-dimensional base material may be used, for example. Note that if the three-dimensional base material (e.g., foamed metal, mesh, woven fabric, non-woven fabric, or an expanded metal) is used, the electrode can be obtained with a high capacity density even if the binder lacks adhesion with the current collector. In addition, favorable high-rate charge/discharge characteristics are exhibited.

Note that even in the case of the current collector in the form of foil, a higher capacity can be obtained in such a manner that a primer layer is formed on the surface of the current collector in advance. The primer layer may have favorable adhesion to the active material and the current collector, and may also have conductivity. For example, a binder mixed with a carbon-based conductive assistant is applied with a thickness of 0.1 to 50 μm onto the current collector, thereby forming a primer layer.

Carbon powder is preferable as the conductive assistant for primer layer. With metal-based conductive assistant, a capacity density can be increased, but input/output characteristics are degraded. With the carbon-based conductive assistant, the input/output characteristics are improved. Examples of the carbon-based conductive assistant include KB, AB, VGCF, graphite, graphane, and a carbon tube. A single type of these materials may be used alone, or two or more of the these materials may be used in combination. Of these materials, the KB or the AB is preferable considering conductivity and a cost.

The types of binder for primer layer is not limited as long as the binder can binds the carbon-based conductive assistant. Note that if an aqueous binder, other than the binder of the present invention, such as PVA, CMC, and sodium alginate is used to form the primer layer, it is often the case that the primer layer dissolves in formation of an active material layer, exhibiting less significant effect. For such reasons, in use of such an aqueous binder, the primer layer may be cross-linked in advance. Examples of a cross-linker include a zirconia compound, a boron compound, and a titanium compound, and the cross-linker may be added at 0.1 to 20% by mass with respect to the amount of binder in formation of the slurry for primer layer.

The primer layer formed as just described can increase, in the case of the current collector in the form of foil, the capacity density using the aqueous binder, and can exhibit favorable high-rate charge/discharge characteristics by a decrease in the degree of polarization even if charging/discharging is performed with high current.

Note that the primer layer have effect not only on the current collector in the form of foil but also on the three-dimensional base material.

The positive electrode of the lithium ion secondary battery according to the present invention may be a lithium ion secondary battery positive electrode using an aqueous binder and an active material containing a compound represented by the following first formula on surfaces of particles of the active material. The first formula is represented by $Li\alpha M\beta O\gamma$. In the formula, "M" is one or more metal elements selected from a group consisting of Al, Ti, Cr, Mn, Fe, Co, Ni, Cu, Zr, Nb, Mo, Ag, Ta, W, and Ir, and $0 \leq \alpha \leq 6$, $1 \leq \beta \leq 5$, and $0 < \gamma \leq 12$ are satisfied. Of these materials, the Zr is preferable as "M," considering heat resistance.

In the present specification, the phrase of the active material containing the metal oxide on the surfaces of the particles of the active material includes meanings as follows: the metal oxide is provided on the surface of the positive electrode as an overcoat layer; the metal oxide is provided such that the surfaces of the particles of the active material are coated with the metal oxide; and both thereof are implemented.

The active material contains the metal oxide on the surfaces of the particles of the active material. Thus, concerns in use of the aqueous binder, i.e., a decrease in a positive electrode active material capacity due to dissolving of lithium from the positive electrode active material and oxidative decomposition of the aqueous binder in charging, can be reduced or prevented. Thus, the high-rate discharge characteristics can be further improved.

Further, since the active material is covered with the metal oxide, an active material whose operating voltage exceeds 4 V can be used in a conventional electrolytic solution. That is, due to an extremely-high redox potential of transition metal, such as divalent to tetravalent Ni or Co or tetravalent to divalent Ni or Co, of a lithium transition metal phosphate compound, the transition metal might take electrons out of the electrolytic solution, leading to oxidative decomposition. However, the active material can be covered with lithium transition metal oxide having oxidation resistance to reduce or prevent direct contact of the active material to the electrolytic solution. Thus, the above-described effect is exhibited.

Since the surface of the electrode and the surfaces of the particles of the active material are coated with the metal oxide, the above-described effect is more exhibited.

The method for coating the surfaces of the particles of the active material with the metal oxide is not limited, but a conventionally-employed method such as a dipping method for adding a predetermined amount of active material powder to a predetermined amount of coating solution containing a metal oxide and then mixing them may be used. However, surfaces of particles of an active material may be, as a simpler method, coated with metal oxide in such a manner that microparticles of the metal oxide are sprayed onto the active material.

Such a coating method using spraying can be easily performed, and is advantageous in cost.

A similar method can be employed in coating the surface of the electrode with the metal oxide.

In the case where the metal oxide is provided on the surface of the positive electrode as the overcoat layer, the thickness of the overcoat layer of the metal oxide on the surface of the electrode is preferably equal to or greater than 0.1 μm and equal to or less than 10 μm.

If the thickness is less than 0.1 μm, such a thickness is not preferable because a decrease in the capacity of the positive electrode active material and oxidative decomposition of the aqueous binder in charging cannot be sufficiently reduced or prevented. If the thickness exceeds 10 μm, such a thickness is not preferable because of the following reasons. The tendency shows that not only the battery capacity decreases due to an increase in an electrode thickness, but also the high-rate discharge characteristics are degraded due to improvement in impedance of the battery.

The active material may contain the mixture of the metal oxide and the conductive assistant on the surfaces of the particles of the active material.

The method may be employed, in which the mixture of metal oxide and a carbon precursor is provided on surfaces of particles of an active material in advance, and then, is carbonized by a heating method.

The heating method is the method for obtaining conductivity in such a manner that heating is performed at 600 to 4,000° C. in a non-oxidizing atmosphere (the state in which oxidization less tends to occur, such as reductive atmosphere, inert atmosphere, and reduced-pressure atmosphere) to carbonize a carbon precursor.

The carbon precursor is not limited as long as the carbon precursor can turn into a carbon material by the heating method. Examples of the carbon precursor include glucose, citric acid, pitch, tahr, and a binder material used for a battery.

The carbon powder is preferably equal to or greater than 0.5% by mass and equal to or less than 20% by mass, where the total of the metal oxide and the carbon powder is taken as 100% by mass.

If the content of the carbon powder is less than 0.5% by mass, such a content is not preferable because the conductivity of the positive electrode cannot be sufficiently improved. If the content of the carbon powder exceeds 20% by mass, such a content is not preferable because the tendency shows that the carbon powder is difficult to uniformly disperse due to shedding of water by carbon in formation of the aqueous slurry and the probability of causing agglomeration of the active material increases.

In the case where the active material is in the form of powder covered with carbon or the case where the carbon-based conductive assistant is used, the tendency shows that the carbon powder is difficult to uniformly disperse due to shedding of water by carbon in formation of the aqueous slurry and the probability of causing agglomeration of the active material increases. In such a case, such a state can be overcome by addition of a surfactant to the slurry.

In this case, e.g., saponin, phospholipid, peptide, or triton is effective as the surfactant, and the surfactant may be added at about 0.01 to 0.1% by mass with respect to the total mass of a plating solution.

<Battery>

The lithium ion secondary battery positive electrode of the present invention can be used to form the lithium ion secondary battery of the present invention.

A material typically used for lithium ion secondary batteries may be used for a negative electrode. Examples of the material include at least one or more elements selected from a group consisting of Li, Na, C, Mg, Al, Si, P, K, Ca, Sc, Ti, V, Cr, Mn, Fe, Co, Ni, Cu, Zn, Ga, Ge, Y, Zr, Nb, Mo, Pd, Ag, Cd, In, Sn, Sb, W, Pb, and Bi, or an alloy, an oxide, a chalcogen compound, or a halogen compound thereof.

Of these materials, at least one or more elements selected from the group consisting of Li, C, Mg, Al, Si, Ti, Zn, Ge, Ag, Cu, In, Sn, and Pb, or an alloy or an oxide thereof, considering an observable discharge plateau region within a range of 0 to 1 V (versus a lithium potential). Considering an energy density, Al, Si, Zn, Ge, Ag, or Sn is preferable as the elements, a combination such as Si—Al, Al—Zn, Si—Mg, Al—Ge, Si—Ge, Si—Ag, Zn—Sn, Ge—Ag, Ge—Sn, Ge—Sb, Ag—Sn, Ag—Ge, or Sn—Sb is preferable as the alloy, and SiO, SnO, SnO2, CuO, or Li4Ti5O12 is preferable as the oxide, for example.

Of these materials, the Si-based materials are preferable because such materials can be used to improve not only the energy density but also the high-rate discharge characteristics. Note, however, that many of the Si-based materials are subject to the significant change in volume due to charging/discharging, and therefore, sufficient cycle characteristics are not exhibited. For such reasons, it is preferable to use SiO decomposing at initial charging a solid electrolyte having lithium ion conductivity and a material capable of reversibly occluding/releasing lithium.

Note that there is no problem if two or more types of the material capable of reversibly occluding/releasing lithium are used.

The lithium ion secondary battery using the positive electrode according to the present invention needs to contain lithium ions, and therefore, lithium salt is preferable as electrolytic salt. Specific examples of the lithium salt include, but not limited to, lithium hexafluorophosphate, lithium perchlorate, lithium tetrafluoroborate, lithium trifluoromethanesulfonate, and lithium trifluoromethanesulfonate imide. A single type of these lithium salts may be used alone, or two or more types of these lithium salts may be used in combination. Since the above-described lithium salts has a high electronegativity and is easily ionized, excellent charging/discharging cycle characteristics are exhibited, and the charging/discharging capacity of the secondary battery can be improved.

For example, propylene carbonate, ethylene carbonate, dimethyl carbonate, diethyl carbonate, or γ-butyrolactone may be used as a solvent of the above-described electrolyte. A single type of these solvents may be used alone, or two or more of these solvents may be used in combination. In particular, the propylene carbonate alone, the mixture of the ethylene carbonate and the diethyl carbonate, or the γ-butyrolactone alone is preferable. Note that the mixture ratio in the mixture of the ethylene carbonate and the diethyl carbonate can be optionally adjusted such that one of the ethylene carbonate or the diethyl carbonate falls within a range of equal to or greater than 10% by volume and equal to or less than 90% by volume.

The electrolyte of the lithium secondary battery of the present invention may be a solid electrolyte or ionic liquid.

According to the description above, the lithium secondary battery having the above-described structure can function as a lithium secondary battery having excellent high-rate discharge characteristics.

The structure of the lithium secondary battery is, but not limited to, applicable to the configurations/structures of layered batteries and winding batteries, for example.

<Electric Equipment>

Since the lithium secondary battery including the positive electrode according to the present invention exhibits favorable safety, such a battery can be utilized as power sources for various types of electric equipment (including vehicles using electricity).

Examples of the electric equipment include air conditioners, washing machines, television sets, refrigerators, freezers, air-cooling equipment, laptop computers, tablets, smartphones, PC keyboards, displays for PCs, desktop PCs, CRT monitors, PC racks, printers, integral PCs, mice, hard drives, PC peripheral equipment, smoothing irons, clothes dryers, window fans, transceivers, air blowers, ventilation fans, television sets, music recorders, music player, ovens, cooking ranges, toilet seats with a cleaning function, fan heaters, stereo component systems for vehicles, vehicle navigation systems, flashlights, humidifiers, portable karaoke machines, ventilation fans, dryers, dry-cell batteries, air purifiers, portable phones, emergency lights, game machines, blood pressure meters, coffee mills, coffee makers, kotatsu, copy machines, disc changers, radios, shavers, juicers, shredders, water purifiers, lighting equipment, dehumidifiers, dish dryers, rice cookers, stereos, stoves, speakers, trouser pressers, vacuums, body fat scales, weight scales, health-meters, movie players, electric carpets, electric rice-cookers, rice cookers, electric shavers, desk lights, electric pots, electronic game machines, portable game machines, electronic dictionaries, electronic organizers, microwaves, electromagnetic cooking equipment, calculators, electric carts, mobility scooters, electric tools, electric toothbrushes, heating pads, haircut tools, telephones, clocks, intercoms, air circulators, electric bug killers, duplicators, hot plates, toasters, dryers, electric drills, water heaters, panel heaters, mills, soldering irons, video cameras, video cassette recorders, fax machines, fan heaters, food processors, futon dryer, headphones, electric pots, electric carpets, microphones, massage machines, fairy lights, mixers, sewing machines, rice-cake makers, floor heating panels, lanterns, remote controllers, cooler/heater boxes, water coolers, freezing stockers, coldair blowers, word processors, whiskers, electronic instruments, motorcycles, toys, lawn mowers, rods, bicycles, automobiles, hybrid automobiles, plug-in hybrid automobiles, electric vehicles, railways, ships, airplanes, and emergency storage batteries.

EXAMPLES

The present invention will be more specifically described below with reference to examples, but the present invention is not limited to these examples.
<Formation of Binder>

First Manufacturing Example

Synthesizing of Vinyl Ester/Ethylene-Unsaturated Carboxylic Acid Ester Copolymer Water of 768 g and anhydrous sodium sulfate of 12 g were introduced into a reactor having a capacity of 2 L and including an agitator, a temperature meter, an N2 gas injection pipe, a reflux condenser, and a dropping funnel, and then, N2 gas was injected to deoxidize the system. Subsequently, partially-saponified polyvinyl alcohol (the degree of saponification is 88%) of 1 g and lauryl peroxide of 1 g were introduced to increase an internal temperature to 60° C. After a methyl acrylate monomer of 104 g (1.209 mol) and a vinyl acetate monomer of 155 g (1.802 mol) were dropped from the dropping funnel for four hours, the resultant was left at an internal temperature of 65° C. for two hours. Then, reaction was completed. Subsequently, a solid content was filtered to obtain a vinyl acetate/methyl acrylate copolymer of 288 g (a water content of 10.4%). The resultant copolymer dissolved in DMF, and then, was filtered. The number average molecular weight obtained by the molecular weight measurement device was 188,000.

Second Manufacturing Example

Synthesizing of Copolymer of Vinyl Alcohol and Alkali Metal-Neutralized Product of Ethylene-Unsaturated Carboxylic Acid Methanol of 450 g, water of 420 g, sodium hydroxide of 132 g (3.3 mol), and a resultant water-containing copolymer of 288 g (a water content of 10.4%) were introduced into a reactor similar to the above-described reactor, and then, saponification reaction was made at 30° C. for three hours in agitation. After completion of the saponification reaction, the resultant saponified product of copolymer was cleaned with methanol, filtered, and dried at 70° C. for six hours. Then, the saponified product of vinyl acetate/methyl acrylate copolymer (the copolymer of vinyl alcohol and sodium acrylate) was obtained in an amount of 193 g. The mass average particle size of the saponified product of vinyl acetate/methyl acrylate copolymer (the copolymer of vinyl alcohol and sodium acrylate) was 180 µm.

Third Manufacturing Example

Milling of Copolymer of Vinyl Alcohol and Sodium Acrylate

The resultant copolymer of vinyl alcohol and sodium acrylate in an amount of 193 g was milled by a jet mill ("LJ" manufactured by Nippon Pneumatic MFG. Co., Ltd.), and as a result, the copolymer of vinyl alcohol and sodium acrylate in fine powder form was obtained in an amount of 173 g. The particle size of the resultant copolymer of vinyl alcohol and sodium acrylate was measured by a laser diffraction-type particle size distribution measurement device ("SALD-7200 manufactured by Shimadzu Corporation), and then, the obtained volume average particle size was converted into a mass average particle size. The mass average particle size was 44 µm. The copolymer of vinyl alcohol and sodium acrylate obtained in the third manufacturing example will be hereinafter referred to as a "copolymer 1."

Fourth Manufacturing Example

The operation similar to that of the first manufacturing example was performed, except that a methyl acrylate monomer of 104 g (1.209 mol) and a vinyl acetate monomer of 155 g (1.802 mol) in the first manufacturing example were changed to a methyl acrylate monomer of 155 g (1.802 mol) and a vinyl acetate monomer of 104 g (1.209 mol). In such a method, a vinyl acetate/methyl acrylate copolymer was obtained. For the resultant copolymer, saponification reaction was made in the manner similar to that of the second manufacturing example, and as a result, the copolymer of vinyl alcohol and sodium acrylate was obtained. The resultant copolymer was milled in the manner similar to that of the third manufacturing example, and as a result, a copolymer 2 having a particle size of 34 µm was obtained.

Fifth Manufacturing Example

The operation similar to that of the first manufacturing example was performed, except that a methyl acrylate monomer of 104 g (1.209 mol) and a vinyl acetate monomer of 155 g (1.802 mol) in the first manufacturing example were changed to a methyl acrylate monomer of 51.8 g (0.602 mol) and a vinyl acetate monomer of 207.2 g (2.409 mol). In such a method, a vinyl acetate/methyl acrylate copolymer was obtained. For the resultant copolymer, saponification reaction was made in the manner similar to that of the second manufacturing example, and as a result, the copolymer of vinyl alcohol and sodium acrylate was obtained. The resultant copolymer was milled in the manner similar to that of the third manufacturing example, and as a result, a copolymer 3 having a particle size of 37 µm was obtained.

For the copolymers 1 to 3 obtained in the manufacturing examples, the viscosity of the 1 mass % aqueous solution, the mass average particle size, and the copolymer composition ratio of vinyl alcohol to sodium acrylate will be shown in Table 1. A saponification rate was 100% for all of the copolymers.

| MANU-FACTURING EXAMPLE | COPOLYMER | 1 MASS % AQUEOUS SOLUTION VISCOSITY (mPa·s) | MASS AVERAGE PARTICLE SIZE (μm) | COPOLYMER COMPOSITION (mol %) VINYL ALCOHOL | COPOLYMER COMPOSITION (mol %) SODIUM ACRYLATE |
|---|---|---|---|---|---|
| 3 | 1 | 1300 | 44 | 60 | 40 |
| 4 | 2 | 3100 | 34 | 40 | 60 |
| 5 | 3 | 300 | 37 | 80 | 20 |

<Thermal Stability of Binder>

For the obtained copolymer 1, thermal stability was evaluated by TG-DTA. In addition, a similar test was conducted on the CMC by way of comparison.

As a result, the copolymer 1 was not carbonized at 400° C., and retained about 70% of the mass thereof, where the mass before the thermal stability test was taken as 100%.

On the other hand, carbonization of the CMC is dramatically accelerated at about 250° C., and the mass of the CMC decreased to 48%. The mass of the CMC decreased to 37% at 400° C., and the CMC was fully carbonized.

Formation of LiFePO4 Positive Electrode

First Example

The followings were mixed together to form a positive electrode mixture in the form of slurry: 90 parts by mass of an active material (LiFePO4 manufactured by Sumitomo Osaka Cement Co., Ltd.); 6 parts by mass of the copolymer (the copolymer 1 shown in Table 1) of vinyl alcohol and sodium acrylate obtained as the binder in the third manufacturing example; 2 parts by mass of a carbon nanotube (VGCF manufactured by Showa Denko K.K.) as a conductive assistant; 2 parts by mass of Ketjen black (ECP-300JD manufactured by Lion Corporation); and 400 parts by mass of water.

The mixture was applied onto aluminum foil having a thickness of 20 μm, and was dried. Then, the aluminum foil and the applied film were firmly bonded together by a roller press machine (manufactured by Oono-Roll Corporation). Subsequently, heating (under reduced pressure at 180° C. for three or more hours) was performed to form a test positive electrode. The composition of each test positive electrode will be shown in Table 2.

The capacity density of the test positive electrode was 0.7 mAh/cm2 (an average thickness of an active material layer: 35 μm).

Second Example

A positive electrode was formed and evaluated by the operation similar to that of the first example, except that the copolymer 1 used in the first example was changed to the copolymer 2 obtained in the fourth manufacturing example.

Third Example

A positive electrode was formed and evaluated by the operation similar to that of the first example, except that the copolymer 1 used in the first example was changed to the copolymer 3 obtained in the fifth manufacturing example.

Fourth Example

A positive electrode was formed and evaluated by the operation similar to that of the first example, except that LiFePO4 as the active material in the first example was changed from 90 parts by mass to 94 parts by mass, and the copolymer 1 used in the first example was changed from 6 parts by mass to 2 parts by mass.

Fifth Example

A positive electrode was formed and evaluated by the operation similar to that of the first example, except that 6 parts by mass of the copolymer 1 used in the first example was changed to 3 parts by mass of the copolymer 1 and 3 parts by mass of carboxymethylcellulose.

Sixth Example

A positive electrode was formed and evaluated by the operation similar to that of the first example, except that 2 parts by mass of the carbon nanotube as the conductive assistant and 2 parts by mass of the Ketjen black in the first example were changed to 4 parts by mass of a carbon nanotube.

Seventh Example

A positive electrode was formed and evaluated by the operation similar to that of the first example, except that 2 parts by mass of the carbon nanotube (VGCF manufactured by Showa Denko K.K.) as the conductive assistant in the first example was changed to 2 parts by mass of a carbon nanotube (NT7 manufactured by Hodogaya Chemical Co., Ltd.).

Eighth Example

A positive electrode was formed and evaluated by the operation similar to that of the first example, except that LiFePO4 in the first example was changed from 90 parts by mass to 92 parts by mass, the carbon nanotube was changed from 2 parts by mass to 1 part by mass, the KB was changed from 2 parts by mass to 1 part by mass.

Ninth Example

A positive electrode was formed and evaluated by the operation similar to that of the first example, except that LiFePO4 in the first example was changed from 90 parts by mass to 95 parts by mass, and the copolymer 1 was changed from 6 parts by mass to 1 part by mass.

Tenth Example

A positive electrode was formed and evaluated by the operation similar to that of the first example, except that 2 parts by mass of the carbon nanotube as the conductive assistant and 2 parts by mass of the Ketjen black in the first example were changed to 4 parts by mass of Ketjen black.

Eleventh Example

A positive electrode was formed and evaluated by the operation similar to that of the first example, except that 2 parts by mass of the carbon nanotube as the conductive assistant and 2 parts by mass of the Ketjen black in the first example were changed to 4 parts by mass of acetylene black.

First Comparative Example

A positive electrode was formed and evaluated by the operation similar to that of the first example, except that the copolymer 1 used in the first example was changed to PVdF (KF Polymer #1120 manufactured by Kureha Corporation), and 200 parts by mass of NMP (N-methyl-2-pyrrolidone) was used instead of 400 parts by mass of the water as a solvent.

Second Comparative Example

A positive electrode was formed and evaluated by the operation similar to that of the first example, except that the copolymer 1 used in the first example was changed to CMC (#2260 manufactured by Daicel FineChem Ltd.).

Third Comparative Example

A positive electrode was formed and evaluated by the operation similar to that of the first example, except that the copolymer 1 used in the first example was changed to PVA (PVA103 manufactured by Kuraray Co. Ltd.).

The positive electrodes of the first to eleventh examples and the first to third comparative examples as described above are shown in Table 2.

<Assembly of Battery>

Metal lithium was used as the antipole of the test positive electrode (the first to eleventh examples and the first to third comparative examples) obtained in the above-described manner. A coin cell (CR2032) including a glass filter (GA-100 manufactured by Advantech Co. Ltd.) as a separator and a solution as an electrolytic solution was formed. The solution was formed in such a manner that LiPF6 is, at a concentration of 1 mol/L, dissolved in a solvent formed by mixing ethylene carbonate (EC) and diethyl carbonate (DEC) at a volume ratio of 1:1, and then, vinylene carbonate (VC) as an additive for the electrolytic solution is added to the resultant at 1% by mass. The coin cell was subject to two cycles of aging at 0.2 C under an environment of 30° C.

<High-Rate Discharge Test>

For the coin cells of the first to eleventh examples and the first to third comparative examples, a high-rate discharge test was performed under an environment of 30° C. Conditions for the high-rate discharge test include charging at 0.5 C and discharging at each of 0.5 C, 1 C, 3 C, 5 C, 10 C, and 30 C. Note that a cutoff potential was set at 4.2 to 2.0 V (vs. Li+/Li).

Table 3 shows an active material capacity at each discharge rate as the results of the high-rate discharge test.

TABLE 2

| | ACTIVE MATERIAL A | BINDER B | BINDER C | CONDUCTIVE ASSISTANT D | CONDUCTIVE ASSISTANT E | POSITIVE ELECTRODE COMPOSITION RATIO (% BY MASS) A:B:C:D:E |
|---|---|---|---|---|---|---|
| EXAMPLE1 | LFP | COPOLYMER1 | — | CNT | KB | 90:6:0:2:2 |
| EXAMPLE2 | LFP | COPOLYMER2 | — | CNT | KB | 90:6:0:2:2 |
| EXAMPLE3 | LFP | COPOLYMER3 | — | CNT | KB | 90:6:0:2:2 |
| EXAMPLE4 | LFP | COPOLYMER1 | — | CNT | KB | 94:2:0:2:2 |
| EXAMPLE5 | LFP | COPOLYMER1 | CMC | CNT | KB | 90:3:3:2:2 |
| EXAMPLE6 | LFP | COPOLYMER1 | — | CNT | — | 90:6:0:4:0 |
| EXAMPLE7 | LFP | COPOLYMER1 | — | CNT | KB | 90:6:0:2:2 |
| EXAMPLE8 | LFP | COPOLYMER1 | — | CNT | KB | 92:6:0:1:1 |
| EXAMPLE9 | LFP | COPOLYMER1 | — | CNT | KB | 95:1:0:2:2 |
| EXAMPLE10 | LFP | COPOLYMER1 | — | — | KB | 90:6:0:0:4 |
| EXAMPLE11 | LFP | COPOLYMER1 | — | — | AB | 90:6:0:0:4 |
| COMPARATIVE EXAMPLE1 | LFP | PVdF | — | — | KB | 90:6:0:0:4 |
| COMPARATIVE EXAMPLE2 | LFP | CMC | — | — | KB | 90:6:0:0:4 |
| COMPARATIVE EXAMPLE3 | LFP | PVA | — | — | KB | 90:6:0:0:4 |

Note:
LPF stands for lithium iron phosphate.
CMC stands for carboxymethylcellulose.
CNT stands for carbon nanotube.
KB stands for Ketjen black.
AB stands for acetylene black.
PVdF stands for polyvinylidene fluoride.
PVA stands for polyvinyl alcohol.

TABLE 3

| | ACTIVE MATERIAL CAPACITY AT EACH DISCHARGE RATE (mAh/g) | | | | | | |
|---|---|---|---|---|---|---|---|
| EXAMPLE | 0.2 C | 0.5 C | 1 C | 3 C | 5 C | 10 C | 30 C |
| EXAMPLE1 | 166 | 163 | 162 | 154 | 148 | 133 | 52 |
| EXAMPLE2 | 160 | 157 | 155 | 147 | 138 | 109 | 47 |
| EXAMPLE3 | 152 | 148 | 150 | 144 | 139 | 105 | 45 |
| EXAMPLE4 | 174 | 171 | 169 | 162 | 158 | 147 | 77 |
| EXAMPLE5 | 163 | 161 | 160 | 153 | 147 | 132 | 51 |
| EXAMPLE6 | 160 | 157 | 155 | 145 | 136 | 108 | 45 |
| EXAMPLE7 | 159 | 156 | 153 | 144 | 135 | 100 | 40 |
| EXAMPLE8 | 158 | 154 | 152 | 144 | 138 | 106 | 34 |
| EXAMPLE9 | 173 | 170 | 168 | 160 | 155 | 145 | 75 |
| EXAMPLE10 | 161 | 157 | 145 | 137 | 128 | 73 | 14 |
| EXAMPLE11 | 151 | 140 | 137 | 125 | 117 | 92 | 20 |
| COMPARATIVE EXAMPLE1 | 143 | 142 | 127 | 103 | 10 | 3 | 0 |
| COMPARATIVE EXAMPLE2 | 150 | 140 | 135 | 119 | 93 | 37 | 0 |
| COMPARATIVE EXAMPLE3 | 152 | 150 | 146 | 97 | 0 | 0 | 0 |

Table 4 shows an average potential (V vs. Li+/Li) at each discharge rate as the results of the high-rate discharge test. At an active material capacity of 0 mAh/g, the average potential in discharging cannot be measured, such a potential is indicated by a hyphen.

TABLE 4

| | AVERAGE POTENTIAL IN DISCHARGING AT EACH DISCHARGE RATE (V) | | | | | | |
|---|---|---|---|---|---|---|---|
| EXAMPLE | 0.2 C | 0.5 C | 1 C | 3 C | 5 C | 10 C | 30 C |
| EXAMPLE1 | 3.35 | 3.33 | 3.32 | 3.24 | 3.18 | 3.04 | 2.66 |
| EXAMPLE2 | 3.35 | 3.34 | 3.33 | 3.26 | 3.15 | 3.02 | 2.63 |
| EXAMPLE3 | 3.34 | 3.32 | 3.3 | 3.16 | 3.06 | 2.86 | 2.52 |
| EXAMPLE4 | 3.36 | 3.34 | 3.31 | 3.21 | 3.13 | 3.05 | 2.75 |
| EXAMPLE5 | 3.35 | 3.33 | 3.32 | 3.25 | 3.15 | 2.95 | 2.6 |
| EXAMPLE6 | 3.34 | 3.32 | 3.31 | 3.23 | 3.17 | 3.03 | 2.65 |
| EXAMPLE7 | 3.33 | 3.23 | 3.22 | 3.04 | 2.99 | 2.92 | 2.61 |
| EXAMPLE8 | 3.35 | 3.33 | 3.32 | 3.24 | 3.18 | 3.04 | 2.65 |
| EXAMPLE9 | 3.35 | 3.33 | 3.32 | 3.25 | 3.2 | 3.07 | 2.87 |
| EXAMPLE10 | 3.35 | 3.33 | 3.29 | 3.11 | 3.02 | 2.87 | 2.45 |
| EXAMPLE11 | 3.21 | 3.17 | 3.13 | 3.02 | 2.97 | 2.86 | 2.77 |
| COMPARATIVE EXAMPLE1 | 3.35 | 3.33 | 3.32 | 3.07 | 2.8 | 2.55 | — |
| COMPARATIVE EXAMPLE2 | 3.35 | 3.33 | 3.32 | 3.13 | 2.98 | 2.9 | — |
| COMPARATIVE EXAMPLE3 | 3.35 | 3.33 | 3.01 | 2.9 | — | — | — |

Typically, the tendency shows that a higher rate results in a higher internal resistance and therefore a lower active material capacity and a lower average potential. As shown in Tables 3 and 4, in the case of using the positive electrodes of the first to eleventh examples, it is obvious that a high discharge capacity and a high discharge potential can be obtained even at a high rate of 30 C.

INDUSTRIAL APPLICABILITY

With the binder of the present invention, excellent battery output characteristics at a discharge rate of equal to or higher than 10 C are exhibited as compared to existing PVdF and CMC binders. The lithium ion secondary battery using the positive electrode according to the present invention is preferably utilized as a main power source for mobile communication equipment, portable electronic equipment, electric bicycles, electric motorcycles, electric automobiles, etc.

The invention claimed is:
1. A lithium ion secondary battery comprising:
 a non-aqueous electrolyte; and
 a positive electrode comprising:
  an active material;
  a conductive assistant; and
  a binder comprising a random copolymer consisting of two copolymerized components, the two components being vinyl alcohol and an alkali metal-neutralized product of ethylene-unsaturated carboxylic acid,
 wherein the random copolymer of vinyl alcohol and the alkali metal-neutralized product of ethylene-unsaturated carboxylic acid comprises a molar ratio of the vinyl alcohol to the alkali metal-neutralized product of ethylene-unsaturated carboxylic acid is 8/2 to 2/8.
2. An electric equipment comprising the lithium ion secondary battery of claim 1.
3. The lithium ion secondary battery of claim 1, wherein the binder is contained at equal to or greater than 0.5% by mass and equal to or less than 30% by mass with respect to a total mass of the active material, the conductive assistant, and the binder.
4. The lithium ion secondary battery of claim 1, wherein a carbon nanotube is contained as the conductive assistant.

5. The lithium ion secondary battery of claim 4, wherein a content of the carbon nanotube in the conductive assistant is at least one of equal to or greater than 30% by mass.

* * * * *